US012697949B2

(12) United States Patent (10) Patent No.: US 12,697,949 B2

Onfroy et al. (45) Date of Patent: Aug. 4, 2026

(54) DISTRIBUTED ARCHITECTURE OF AIRCRAFT BRAKING SYSTEM

(71) Applicant: SAFRAN LANDING SYSTEMS, Velizy-Villacoublay (FR)

(72) Inventors: Dominique Onfroy, Moissy-Cramayel (FR); Olivier Frey, Moissy-Cramayel (FR); Brian Goyez, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 500 days.

(21) Appl. No.: 17/924,527

(22) PCT Filed: May 6, 2021

(86) PCT No.: PCT/EP2021/062084

§ 371 (c)(1),
(2) Date: Nov. 10, 2022

(87) PCT Pub. No.: WO2021/228696

PCT Pub. Date: Nov. 18, 2021

(65) Prior Publication Data

US 2023/0227010 A1 Jul. 20, 2023

(30) Foreign Application Priority Data

May 12, 2020 (FR) ...................................... 2004674

(51) Int. Cl.
B60T 8/17 (2006.01)
B60T 13/74 (2006.01)
(Continued)

(52) U.S. Cl.
CPC .......... B60T 8/1703 (2013.01); B60T 13/746 (2013.01); B60T 17/22 (2013.01); B64C 25/44 (2013.01);
(Continued)

(58) Field of Classification Search
CPC .... B60T 13/741; B60T 13/746; B60T 8/1703; B60T 17/22; B60T 2270/402; B60T 2270/413; B64C 25/44
See application file for complete search history.

(56) References Cited

U.S. PATENT DOCUMENTS

2017/0152027 A1* 6/2017 Onfroy ................. B60T 13/741
2020/0023821 A1* 1/2020 Goyez ..................... F16D 65/16
2020/0101953 A1* 4/2020 Onfroy ................... B64C 25/46

FOREIGN PATENT DOCUMENTS

EP 2 463 166 A1 6/2012
EP 2 641 791 A1 9/2013
(Continued)

OTHER PUBLICATIONS

International Search Report for PCT/EP2021/062084 dated, Jul. 14, 2021 (PCT/ISA/210).

*Primary Examiner* — Vishal R Sahni

(74) *Attorney, Agent, or Firm* — Sughrue Mion, PLLC

(57) ABSTRACT

A braking system architecture for aircraft includes a brake including electromechanical actuators, each electromechanical actuator including a digital communication module, a power supply, two controllers, each being connected to a distinct group of one or more electromechanical actuators and including an upstream digital communication module, a control module arranged to generate digital control signals, and a downstream digital communication module connected to the digital communication modules of the electromechanical actuators of the group in order to transmit the digital control signals to the power modules of the electromechanical actuators, and a digital communication network to which the upstream digital communication modules of both controllers are connected.

6 Claims, 3 Drawing Sheets

(51) Int. Cl.
  *B60T 17/22*    (2006.01)
  *B64C 25/44*    (2006.01)

(52) U.S. Cl.
  CPC ... *B60T 2270/402* (2013.01); *B60T 2270/413*
                (2013.01)

(56)       References Cited

FOREIGN PATENT DOCUMENTS

| | | | |
|---|---|---|---|
| EP | 2 719 592 | A | 4/2014 |
| EP | 3 176 083 | A1 | 6/2017 |
| EP | 3 483 063 | A1 | 5/2019 |
| EP | 3 632 795 | A1 | 4/2020 |
| FR | 3 063 187 | A1 | 8/2018 |
| FR | 3073203 | A1 * | 5/2019 ........... B60T 13/746 |

* cited by examiner

DISTRIBUTED ARCHITECTURE OF AIRCRAFT BRAKING SYSTEM

CROSS REFERENCE TO RELATED APPLICATIONS

This application is a National Stage of International Application No. PCT/EP2021/062084 dated May 6, 2021, claiming priority based on French Patent Application No. 2004674 filed May 12, 2020, the contents of each of which being herein incorporated by reference in their entireties.

The invention relates to the field of electrical braking systems for aircraft.

BACKGROUND OF THE INVENTION

FIG. 1 shows a conventional, so-called "centralized", electrical braking system for aircraft.

In that architecture, each brake 1 for braking a wheel of the aircraft comprises friction members (e.g. a stack of carbon disks) together with four electromechanical actuators 2 that are grouped together in two distinct groups, each of two electromechanical actuators 2. The electromechanical actuators 2 in any one group are all connected to the same centralized computer 3 situated in the fuselage of the aircraft.

The pilot of the aircraft (or else the autopilot system) generates a braking setpoint.

Each centralized computer 3 acquires the braking setpoint and executes monitoring and control of the electromechanical actuators 2 to which it is connected. The monitoring and control of the electromechanical actuators 2 makes use of one or more servo control loops.

The centralized computer 3 thus generates three-phase power supply current for powering the electric motor of each electromechanical actuator 2 to which it is connected. The three-phase power supply current is transmitted to the electric motor, which then actuates the pusher of said electromechanical actuator 2. The pusher slides, applies a braking force to the friction members of the brake 1, and thus exerts a braking torque on the wheel.

Each centralized computer 3 also acquires measurements of one or more servo control parameters that are taken by sensors situated in each electromechanical actuator 2 to which the centralized computer 3 is connected (or else in its proximity: on the brake 1, on the wheel, etc.). By way of example, these measurements include measurements of the angular position of the rotor of the electric motor. These measurements constitute the return signals of the above-mentioned servo control loop(s).

That centralized architecture presents a certain number of drawbacks.

That architecture requires at least nine electric wires to be used for each electromechanical actuator 2: three power supply wires 4 for the three phases of the electric motor (symbolized in FIG. 1 by a single line), four communication wires 5 (symbolized in FIG. 1 by a single line) for returning the servo control parameter measurements to the centralized computer 3, and two power supply wires 6 (symbolized in FIG. 1 by a single line) for powering a blocking member for blocking the electromechanical actuator 2 in order to provide a parking brake. These electric wires are incorporated in harnesses that run down from the aircraft fuselage to the brake 1 and that are therefore bulky and heavy. The long length of the harnesses in which the power supply wires 4 run conveying the electric currents powering the electric motors make it necessary to use filter circuits for electromagnetic compatibility, thereby increasing the weight, the complexity, and the cost of the centralized computers 3.

In order to mitigate those drawbacks, proposals have been made to use a distributed architecture as shown in FIG. 2.

In that architecture, each electromechanical actuator 10 of the brake 11 includes not only its electric motor and its brake, but also a power module and a digital communication module 12. The digital communication modules 12 and the electromechanical actuators 10 of the brake 11 are interconnected in order to form a digital network. That architecture also has two power supply units 14 for powering the power modules of the electromechanical actuators 10 of the brake 11 by delivering a power supply voltage to them, together with two control units 15 adapted to generate digital control signals for the electric motors, which signals are sent to the digital communication modules 12. The digital communication module 12 of each electromechanical actuator 10 transmits the digital control signals to the power module so that each power module generates power supply current based on its digital control signals and taken from the power supply voltage. Finally, that architecture includes a network interconnection member 16 that is connected to both of the control units 15 and that is integrated in the digital network in order to distribute the digital control signals to the digital communication modules 12 of the electromechanical actuators 10 via the digital network. In that architecture, the generation of the power supply currents for the electric motors is thus "distributed" among the electromechanical actuators.

That architecture is most advantageous and serves to resolve the above-mentioned problems.

Nevertheless, that architecture also presents some drawbacks.

In particular, it can be seen that the connection member 16 forms a "common point" in the control system having the two the control units 15, such that a single failure in the connection member 16 can lead to a total loss of braking on the wheel.

Furthermore, proposals have been made to position the connection member 16 in the proximity of the wheel, at the bottom of the undercarriage. That position is problematic, since it is in a zone that is subjected to environmental conditions that are particularly severe and thus not suitable for receiving electronics. Furthermore, that zone has very little available space, thereby making it complicated to "physically" incorporate the connection member 16 on the undercarriage.

OBJECT OF THE INVENTION

An object of the invention is to provide an architecture for an aircraft braking system that benefits from the advantages of an architecture that is distributed but without suffering from the above-mentioned drawbacks.

SUMMARY OF THE INVENTION

In order to achieve this object, there is provided an architecture for an aircraft braking system, the architecture comprising:

a brake for braking an aircraft wheel, the brake comprising friction members and a plurality of electromechanical actuators for applying a braking force to the friction members and thus exerting a braking torque on the wheel, each electromechanical actuator comprising an electric motor, a power module for generating power supply current for the electric motor, and a digital communication module;

at least one power supply unit for powering the power modules by delivering a power supply voltage thereto;

two control units, each control unit being connected to a distinct group of one or more electromechanical actuators and comprising an upstream digital communication module, a control module arranged to generate digital control signals, and a downstream digital communication module connected to the digital communication modules of the electromechanical actuators of said group in order to transmit the digital control signals to the power modules of said electromechanical actuators, such that each power module generates power supply current based on the digital control signals and taken from the power supply voltage; and a digital communication network to which the upstream digital communication modules of both control units are connected.

Thus, in the architecture of the invention, the power supply current for each electric motor is generated within the electromechanical actuator, thus making it possible to benefit from the advantages of an architecture that is distributed, as described above.

This architecture also makes it possible to benefit from the advantages of architectures that are centralized.

In particular, the electromechanical actuators of a given brake can be controlled by control units that are incorporated in two different housings, without this architecture requiring an individual piece of equipment for performing the function of the above-mentioned connection member. This avoids losing braking on any one wheel the event of a single failure.

This therefore improves the reliability of the braking system by reducing the amount of electronics positioned at the bottom of an undercarriage, and integration of the system is made simpler. Recurrent costs are also reduced in the braking system by reducing the number of pieces of equipment in said system.

There is also provided an architecture as described above wherein the brake comprises two distinct groups, each of two electromechanical actuators, and wherein each control unit is connected to the two electromechanical actuators of a respective one of the two distinct groups in order to control them.

There is also provided an architecture as described above comprising a plurality of brakes, each for braking a distinct wheel of the aircraft, two control units associated with each brake, and also housings, each incorporating two control units.

There is also provided an architecture as described above wherein the two control units associated with a given brake are incorporated in two different housings.

There is also provided an architecture as described above wherein the two control units incorporated in a given housing are of hardware and/or software designs that are dissimilar, at least in part.

There is also provided an architecture as described above wherein the two control units associated with a given brake are of hardware and/or software design that are dissimilar, at least in part.

There is also provided an architecture as described above wherein the electromechanical actuators of the brake are arranged to transmit digital measurement signals to the control modules of the control units via the digital communication modules of the electromechanical actuators and the downstream digital communication modules of the control units.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

The invention is described below as implemented in an airplane having a plurality of main undercarriages, each carrying a plurality of so-called "braked" wheels, i.e. a plurality of wheels each fitted with a brake for braking the airplane.

Figure 1:
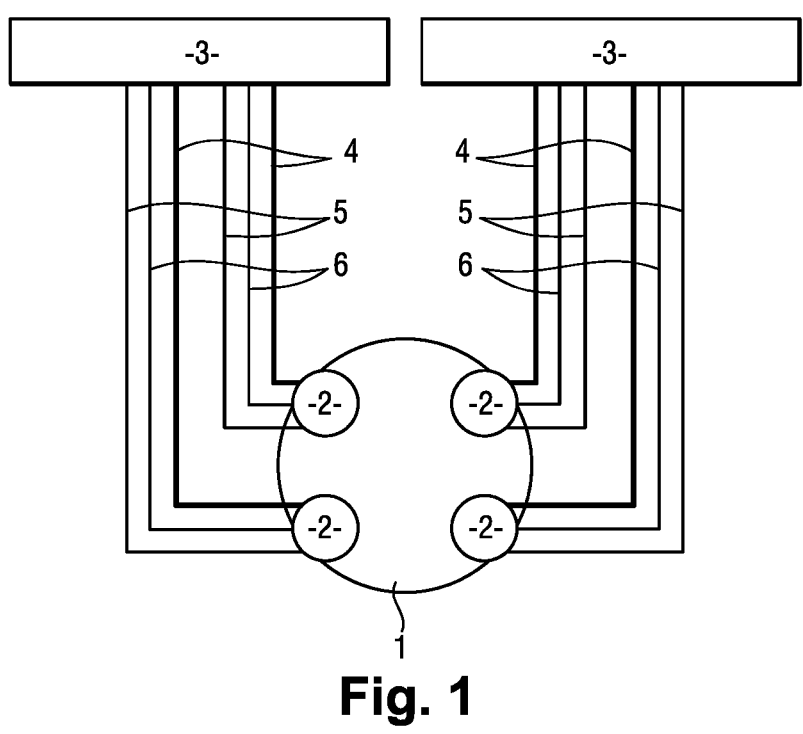
FIG. 1 shows a brake and two centralized computers in a prior art architecture that is centralized.
Figure 2:
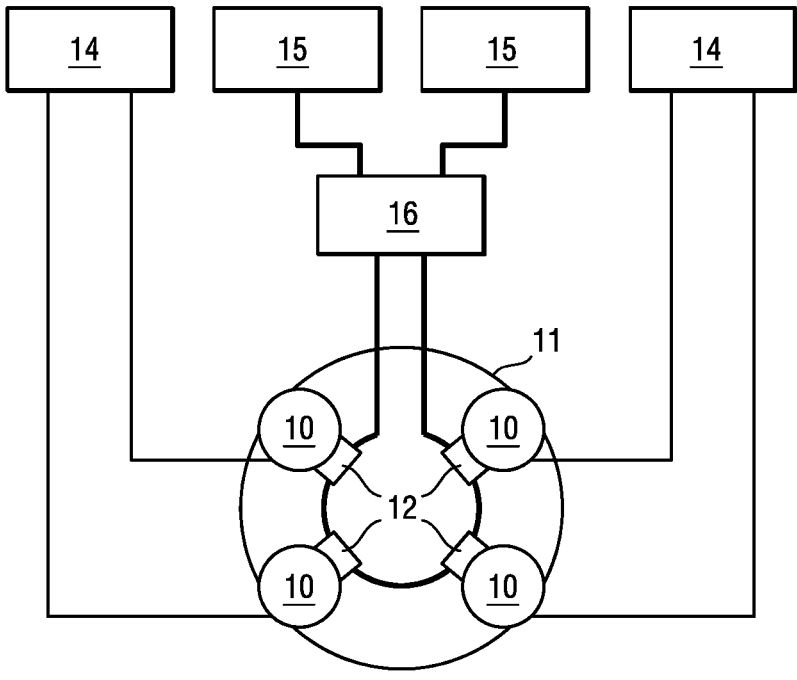
FIG. 2 shows a brake, two power supply units, two control units, and an interconnection member in a prior art architecture that is distributed.
Figure 3:
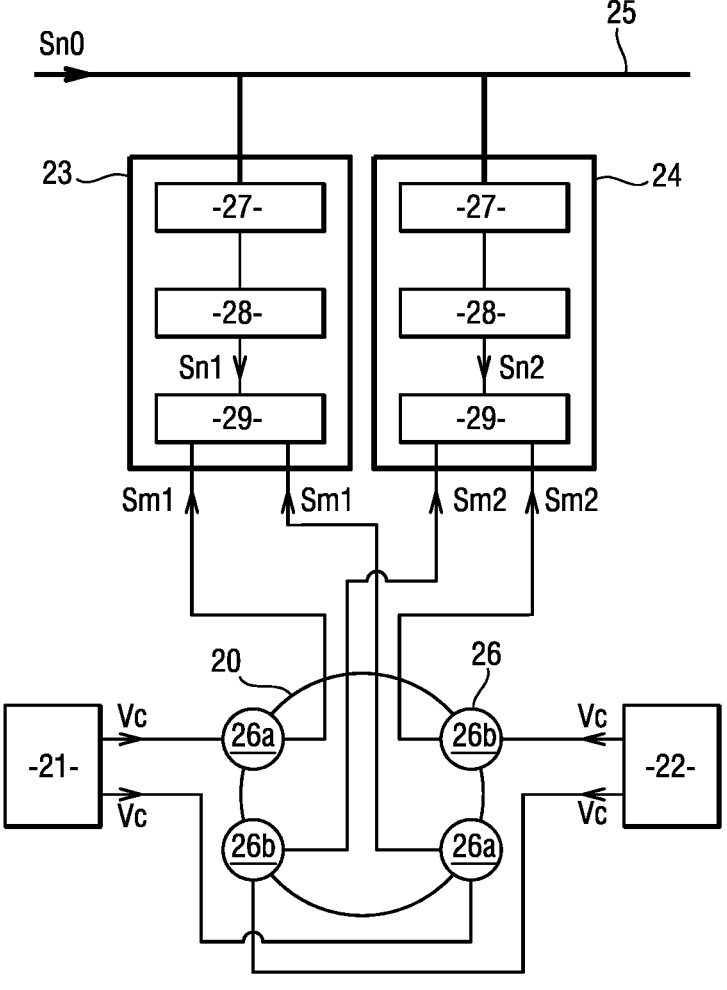
FIG. 3 shows a brake, two power supply units, two control units, and a digital communication network in an architecture of the invention.

With reference to FIG. 3, in this example the architecture of the braking system of the invention comprises, for each braked wheel of the airplane, a brake 20, a first power supply unit 21, a second power supply unit 22, a first control unit 23, a second control unit 24, and a digital communication network 25 that is a high level network (HLN).

The brake 20 includes an actuator-carrier on which there are mounted four electromechanical brake actuators 26 and friction members, specifically a stack of carbon disks.

The four electromechanical actuators 26 are used to apply a braking force against the stack of carbon disks and thereby exert a braking torque on the wheel, slowing down rotation of the wheel, and thus braking the airplane when it is on the ground.

Each electromechanical actuator 26 comprises a body fastened to the actuator-carrier, a pusher, and a blocking member adapted to hold the pusher in position. An electric motor, a power module, and a digital communication module are incorporated inside the body of each electromechanical actuator 26.

The pusher is actuated by the electric motor in order to slide and apply a braking force against the stack of carbon disks.

The power module serves to generate alternating power supply current that flows in the three phases of electric motor when it is appropriate to actuate the pusher and thus brake the wheel. For this purpose, the power module includes an inverter comprising a plurality of switches that are controlled so as to transform a direct current (DC) power supply voltage Vc into a three-phase alternating current (AC) voltage used for generating power supply current for the electric motor.

The four electromechanical actuators 26 are grouped together in first and second distinct groups, the first group comprising the two of the electromechanical actuators 26a and the second group also comprising the two of the electromechanical actuators 26b.

The term "distinct groups" should be understood as meaning that an electromechanical actuator that belongs to one of the groups does not belong to the other group.

It should be observed that when the brake 20 is seen face-on from behind, as in FIG. 3, the first group comprises one electromechanical actuator 26a situated on a top left portion and one electromechanical actuator 26a situated on a bottom right portion of the actuator-carrier, while the second group comprises one electromechanical actuator 26b situated on a top right portion and one electromechanical actuator 26b situated on a bottom left portion of the actuator-carrier. Thus, the loss of one of the groups, e.g. as a result of losing part of the control system, leads to losing half of the braking of the wheel, while still conserving braking both on the left and also on the right and also in the top and bottom portions of the brake 20.

The first power supply unit 21 and the second power supply unit 22 are for powering the power modules of the four electromechanical actuators 26.

The first power supply unit 21 delivers the power supply voltage Vc to the power modules of the electromechanical actuators 26a of the first group, while the second power supply unit 22 delivers the power supply voltage Vc to the power modules of the electromechanical actuators 26b of the second group.

The first power supply unit 21 and the second power supply unit 22 are positioned in the fuselage at the top of the undercarriage, inside a bay of the airplane.

Likewise, the first control unit 23 and the second control unit 24 are positioned in the fuselage.

Each of the first and second control units 23 and 24 includes a respective upstream digital communication module 27, a respective control module 28, and a respective downstream digital communication module 29.

The first control unit 23 is connected to the electromechanical actuators 26a of the first group in order to control them. The second control unit 24 is connected to the electromechanical actuators 26b of the second group in order to control them.

The downstream digital communication module 29 of the first control unit 23 is connected to the digital communication modules of the electromechanical actuators 26a of the first group. The downstream digital communication module 29 of the second control unit 24 is connected to the digital communication modules of the electromechanical actuators 26b of the second group.

The upstream digital communication module 27 of the first control unit 23 and the upstream digital communication module 27 of the second control unit 24 are connected to the digital communication network 25.

Thus, when a pilot of the airplane or the autopilot system produces a braking setpoint, the braking setpoint is transformed into a digital setpoint signal Sn0 that travels over the digital communication network 25.

The upstream digital communication module 27 of the first control unit 23 acquires the digital setpoint signal Sn0 and transmits it to the control module 28 of the first control unit 23. The control module 28 implements one or more servo control loops and generates first digital control signals Sn1. The first digital control signals Sn1 are transmitted to the downstream digital communication module 29 of the first control unit 23, which transmits them to the electromechanical actuators 26a of the first group.

The digital communication module of each electromechanical actuator 26a of the first group acquires the first digital control signals Sn1 and transmits them to the power module of said electromechanical actuator 26a. The power module of the electromechanical actuator 26a generates power supply current based on the first digital control signals Sn1 and taken from the power supply voltage Vc. When powered, the electric motor actuates the pusher of the electromechanical actuator 26a in order to brake the wheel.

Measurements of servo control parameters are taken in each of the electromechanical actuators 26a. By way of example, these measurements are measurements of the angular position and/or of the angular velocity of the rotor of the electric motor, measurements of the power supply current, measurements of the position of the pusher, etc. These measurements are digitized, and they form first digital measurement signals Sm1 that are transmitted by the electromechanical actuator 26a to the control module 28 of the first control unit 23 via the digital communication module of the electromechanical actuator 26a and the downstream digital communication module 29 of the first control unit 23.

These first digital measurement signals Sm1 constitute the return signals of the above-mentioned servo control loop(s).

Likewise, The upstream digital communication module 27 of the second control unit 24 acquires the digital setpoint signal Sn0 and transmits it to the control module 28 of the second control unit 24. The control module 28 implements one or more servo control loops and generates second digital control signals Sn2. The second digital control signals Sn2 are transmitted to the downstream digital communication module 29 of the second control unit 24, which transmits them to the electromechanical actuators 26b of the second group.

The digital communication module of each electromechanical actuator 26b of the second group acquires the second digital control signals Sn2 and transmits them to the power module of said electromechanical actuator 26b. The power module of the electromechanical actuator 26b generates power supply current based on the second digital control signals Sn2 and taken from the power supply voltage Vc. When powered, the electric motor actuates the pusher of the electromechanical actuator 26b in order to brake the wheel.

Measurements of servo control parameters are taken in each of the electromechanical actuators 26b. By way of example, these measurements are measurements of the angular position and/or of the angular velocity of the rotor of the electric motor, measurements of the power supply current, measurements of the position of the pusher, etc. These measurements are digitized, and they form second digital measurement signals Sm2 that are transmitted by the electromechanical actuator 26b to the control module 28 of the second control unit 24 via the digital communication module of the electromechanical actuator 26b and the downstream digital communication module 29 of the second control unit 24. These second digital measurement signals Sm2 constitute the return signals of the above-mentioned servo control loop(s).

It should be observed that the first and second digital control signals Sn1 and Sn2 may be identical, or else they may be different and thus specific respectively to the electromechanical actuators 26a of the first group and to the electromechanical actuators 26b of the second group.

Likewise, within the first digital control signals Sn1, the digital control signals for each of the electromechanical actuators 26a may be identical or they may be different. Within the second digital control signals Sn2, the digital control signals for each of the electromechanical actuators 26b may be identical or they may be different.

The various electromechanical actuators 26 of the brake are thus controlled by two control units 23 and 24. Interconnection between two control units 23 and 24, and also between the two digital communication modules of the electromechanical actuators 26, thus takes place via the digital communication network 25.

Advantageously, the architecture comprises two control units associated with each brake, together with housings, each incorporating two control units. Each housing, together with the two control units incorporated in said housing, thus forms a single piece of equipment.

The two the control units that are connected to the electromechanical actuators of a single brake are incorporated in two different housings.

Figure 4:
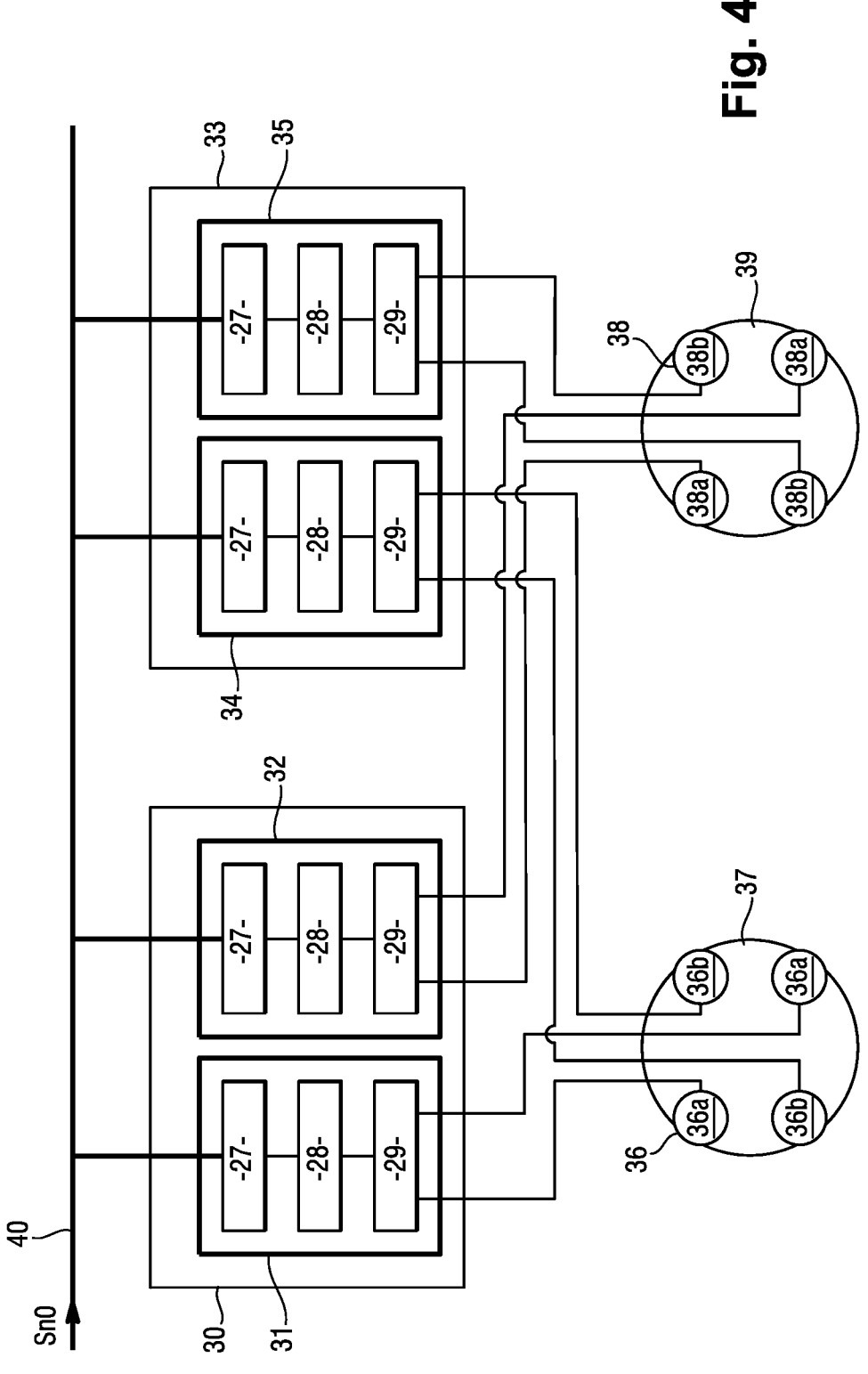
FIG. 4 is a figure similar to FIG. 3, with two brakes and four control units incorporated in two housings.

Thus, in FIG. 4, the first housing 30 has a first control unit 31 and a second control unit 32, and the second housing 33 has a first control unit 34 and a second control unit 35. It should be observed that the power supply units are not shown in FIG. 4 for greater readability.

The first control unit 31 of the first housing 30 is connected to the electromechanical actuators 36*a* of the first group of electromechanical actuators of the first brake 37 in order to control them. The second control unit 32 of the first housing 30 is connected to the electromechanical actuators 38*a* of the first group of electromechanical actuators of the second brake 39 in order to control them.

Likewise, the first control unit 34 of the second housing 33 is connected to the electromechanical actuators 36*b* of the second group of electromechanical actuators of the first brake 37 in order to control them. The second control unit 35 of the second housing 33 is connected to the electromechanical actuators 38*b* of the second group of electromechanical actuators of the second brake 39 in order to control them.

The first and second control units 31 and 33 of the first housing 30, and the first and second control units 34 and 35 of the second housing 33 are all connected to a digital communication network 40.

The first and second housings 30 and 32 are identical, thereby simplifying equipment management. The first control unit 31 and the second control unit 35 are identical. The second control unit 32 and the first control unit 34 are identical.

Advantageously, the two control units incorporated in a given housing are of hardware and/or software designs that are dissimilar, at least in part.

Thus, the first and second control units 31 and 32 that are incorporated in the first housing 30 are dissimilar, at least in part, in their hardware and/or software designs (i.e. they include one or more electronic components and/or one or more software modules that are different). The first and second control units 34 and 35 that are incorporated in the second housing 33 are dissimilar, at least in part, in their hardware and/or software designs.

Likewise, the two control units associated with a given brake are of hardware and/or software designs that are dissimilar, at least in part.

Thus, The first control units 31 and 34 that are associated with the first brake 37 are dissimilar, at least in part, in their hardware and/or software designs. The second control units 32 and 35 that are associated with the second brake 39 are dissimilar, at least in part, in their hardware and/or software designs.

These dissimilarities serve to avoid a common mode failure of a component in one of the control units leading to total loss of the braking controlled by a housing: a common mode failure of all of the control units of a given type would lead to the loss of braking by two actuators per brake, which is preferable to losing all braking on any one brake.

The braking system architecture is thus based on digital communication at two levels, making it possible to incorporate different functional modules in a minimum number of housings while also enabling the control of the electromechanical actuators of a given brake to be distributed among different housings.

Naturally, the invention is not limited to the embodiment described, but covers any variant coming within the ambit of the invention as defined by the claims.

It is naturally possible to make provision for the number of electromechanical actuators per brake to be other than four. Each housing could thus incorporate a number of control units that is other than two. Each control unit could control a number of electromechanical actuators that is other than two. The number of electromechanical actuators controlled by each control unit could be different, depending on the control units.

The invention claimed is:

1. An architecture for an aircraft braking system, the architecture comprising:

a plurality of brakes, each brake for braking a distinct wheel of the aircraft and each brake comprising friction members and a plurality of electromechanical actuators for applying a braking force to the friction members and thus exerting a braking torque on the distinct wheel, each electromechanical actuator comprising an electric motor, a power module for generating power supply current for the electric motor, and a digital communication module;

the architecture further comprising at least one power supply unit, in a fuselage of the aircraft, for powering the power modules by delivering a power supply voltage thereto;

the architecture further comprising, for each brake, a pair of control units associated with each brake, in the fuselage of the aircraft, each control unit being connected to a distinct group of one or more electromechanical actuators and comprising an upstream digital communication module, a control module arranged to generate digital control signals, and a downstream digital communication module connected to the digital communication modules of the electromechanical actuators of said group in order to transmit the digital control signals to the power modules of said electromechanical actuators, such that each power module generates power supply current based on the digital control signals and taken from the power supply voltage;

the architecture further comprising a digital communication network to which the upstream digital communication modules of the control units are connected; and the architecture further comprising a plurality of housings in the fuselage configured to house the control units, the plurality of housings being arranged such that:

each housing of the plurality of housings incorporates two control units, and each control unit of the pair of control units associated with each brake are incorporated in two different housings among the plurality of housings.

2. An architecture according to claim 1, wherein each brake comprises two distinct groups, each of two electromechanical actuators, and wherein each control unit is connected to the two electromechanical actuators of a respective one of the two distinct groups in order to control them.

3. An architecture according to claim 1, wherein the two control units incorporated in each housing are of hardware and/or software designs that are dissimilar, at least in part.

4. An architecture according to claim 1, wherein the pair of control units associated with each brake are of hardware and/or software designs that are dissimilar, at least in part.

5. An architecture according to claim 1, wherein the electromechanical actuators of the brake are arranged to transmit digital measurement signals to the control modules of the control units via the digital communication modules of the electromechanical actuators and the downstream digital communication modules of the control units.

6. An architecture according to claim 1, wherein a first control unit of the pair of control units associated with each brake is incorporated into one housing of the plurality of housings, and a second control unit of the pair of control units associated with each brake is incorporated into a housing of the plurality of housings different than the one housing of the plurality of housings in which the first control unit is incorporated.

* * * * *